UNITED STATES PATENT OFFICE.

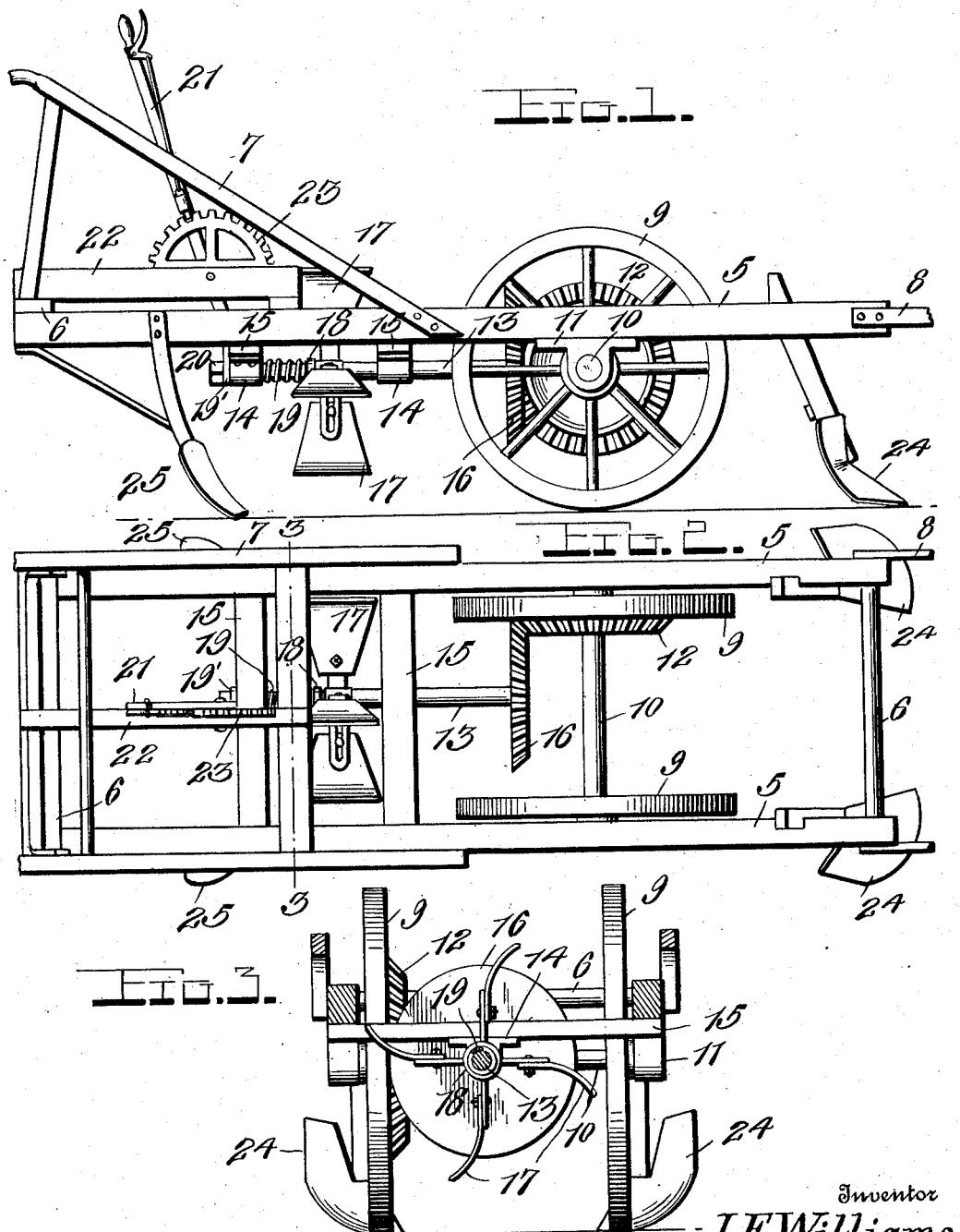

JAMES ELI WILLIAMS, OF CLAY, MISSISSIPPI.

COTTON-CHOPPER.

1,015,369.  Specification of Letters Patent.  Patented Jan. 23, 1912.

Application filed October 22, 1910. Serial No. 588,530.

*To all whom it may concern:*

Be it known that I, JAMES E. WILLIAMS, a citizen of the United States, residing at Clay, in the county of Itawamba and State of Mississippi, have invented certain new and useful Improvements in Cotton-Choppers, of which the following is a specification, reference being had to the accompanying drawings.

This invention relates to cotton chopping machines and has for its object to provide a very simple and efficient machine of this character which will quickly thin the rows as the machine moves over the field, and means for throwing the chopping hoes out of operation when passing over sparsely grown portions of the row and in turning the machine.

With the above and other objects in view, the invention consists of the novel features of construction, combination and arrangement of parts hereinafter fully described and claimed, and illustrated in the accompanying drawings, in which—

Figure 1 is a side elevation of a cotton chopping machine constructed in accordance with my invention; Fig. 2 is a top plan view thereof; and Fig. 3 is a section taken on the line 3—3 of Fig. 2.

Referring in detail to the drawing 5 designates the parallel longitudinal side bars of the machine frame which are connected at their front and rear ends by the cross bar 6. Suitable handles 7 are also connected to the side bars of the frame and extend upwardly and rearwardly therefrom into convenient position to be grasped by the operator to guide the machine in its movement. Draft attaching means 8 is connected to the forward ends of the longitudinal bars 5.

The machine frame is mounted upon the supporting wheels 9 which are fixed on the axle 10 journaled in bearings 11 secured to the under side of the longitudinal bars 5. Upon the inner face of one of these wheels a crown gear 12 is secured. The hoe shaft 13 is longitudinally disposed and rotatably mounted in bearings 14 secured to the under sides of the transverse bars 15 which connect the longitudinal frame bars 5 intermediate of their ends. A gear 16 is secured to the forward end of the hoe shaft 13 and meshes with the teeth of the gear 12 whereby rotary movement is transmitted from the ground wheel to the hoe shaft. A plurality of chopping hoes 17 are arranged upon the shaft 13 between the transverse bars 15. Any desired number of these hoe blades may be employed and are preferably adjustable radially from the shaft 13.

A collar 18 is secured upon the shaft 13 adjacent to the chopping hoes and between this collar and the bearing 14 on the rear transverse bar 15 a coiled spring 19 is arranged on said shaft. This spring normally forces the shaft upwardly in its bearings to engage the gears 16 and 12. An arm 19' is secured to the rear end of the hoe shaft, being provided with an opening through which said shaft extends and a nut 20 is threaded on said shaft to retain the arm thereon. To the arm 19' the lower end of an adjusting lever 21 is connected, said lever being pivoted upon a longitudinal bar 22 arranged on the frame of the machine and carrying the usual spring actuated dog for engagement with the teeth of a rack 23 secured upon said bar.

From the foregoing it will be seen that when it is desired to discontinue the cutting operation of the hoe blades, the operator simply moves the lever 21 forwardly which slides the hoe shaft 13 rearwardly in its bearings thus disengaging the gear 16 from the teeth of the crown gear 12 carried by the supporting wheel. In this manner the cutting operation may be interrupted at any time, as when a sparsely grown portion of the row is reached, or in turning the machine at the end of the row.

Plows 24 are mounted in the forward end of the frame of the machine to move upon opposite sides of the row of plants and throw the dirt outwardly therefrom. Other plows 25 are arranged in the rear end of the machine frame and are adapted to direct the dirt inwardly upon the roots of the plants after the cutting operation.

From the foregoing it is believed that the construction and operation of my improved cotton chopping machine will be readily understood. The same is comparatively simple, strong and durable and also highly efficient in practical use.

The machine may also be constructed at a comparatively low cost.

Having thus described the invention what is claimed is:—

In a cotton chopper, the combination of a frame having plows and handles, an axle shaft, bearings therefor, supporting wheels and a beveled gear on the axle shaft, a longitudinally movable shaft having chopping elements, bearings for said longitudinally movable shaft, a beveled gear at the front end of said longitudinally movable shaft to engage and disengage that on the axle shaft, a spring acting to normally move the longitudinally movable shaft forwardly and engage its gear with that on the axle shaft, a lever to move said longitudinally movable shaft rearwardly and disengage its gear from that of the axle shaft, the said longitudinally movable shaft being connected to the said lever for rearward movement independently of the lever, and means to lock the lever in adjusted position.

In testimony whereof I hereunto affix my signature in the presence of two witnesses.

JAMES ELI WILLIAMS.

Witnesses:
K. L. MAXCY,
R. H. WILLIAMS.

Copies of this patent may be obtained for five cents each, by addressing the "Commissioner of Patents, Washington, D. C."